(No Model.) 7 Sheets—Sheet 1.

A. W. SAVAGE.
FIBER CLEANING MACHINE.

No. 361,838. Patented Apr. 26, 1887.

WITNESSES:
Donn Twitchell
C. Sedgwick

INVENTOR
A. W. Savage
BY Munn & Co
ATTORNEYS.

(No Model.) 7 Sheets—Sheet 4.

A. W. SAVAGE.
FIBER CLEANING MACHINE.

No. 361,838. Patented Apr. 26, 1887.

WITNESSES:
Donn Twitchell
C. Sedgwick

INVENTOR:
A. W. Savage
BY Munn & Co
ATTORNEYS.

(No Model.) 7 Sheets—Sheet 5.

A. W. SAVAGE.
FIBER CLEANING MACHINE.

No. 361,838. Patented Apr. 26, 1887.

WITNESSES:
Donn Twitchell
C. Sedgwick

INVENTOR:
A. W. Savage
BY Munn & Co.
ATTORNEYS.

N. PETERS, Photo-Lithographer, Washington, D. C.

(No Model.) 7 Sheets—Sheet 6.
A. W. SAVAGE.
FIBER CLEANING MACHINE.
No. 361,838. Patented Apr. 26, 1887.
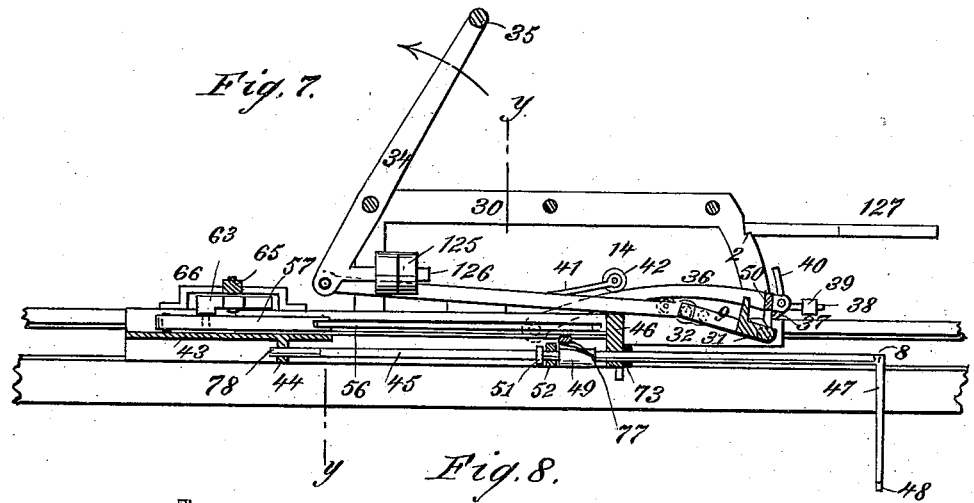
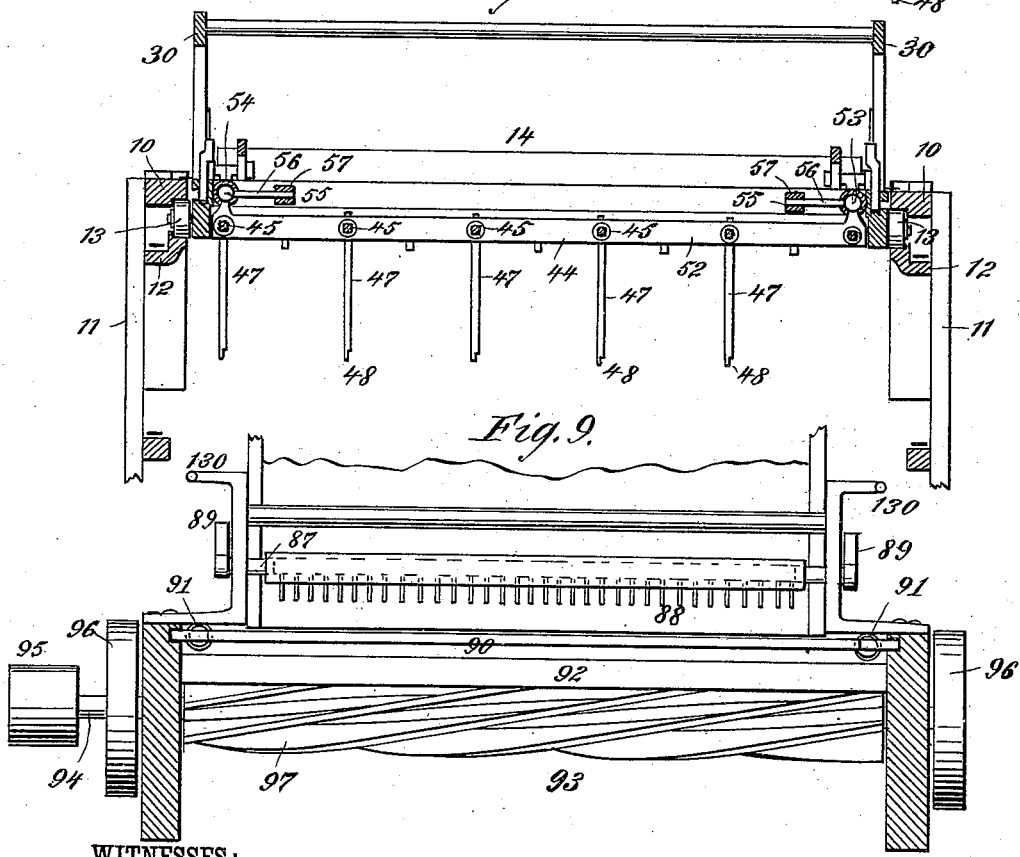
WITNESSES: Donn Twitchell, C. Sedgwick
INVENTOR: A. W. Savage
BY Munn & Co.
ATTORNEYS.

(No Model.)  7 Sheets—Sheet 7.

A. W. SAVAGE.
FIBER CLEANING MACHINE.

No. 361,838. Patented Apr. 26, 1887.

WITNESSES:
Donn Twitchell
C. Sedgwick

INVENTOR:
A. W. Savage
BY Munn & Co.
ATTORNEYS.

United States Patent Office.

ARTHUR WILLIAM SAVAGE, OF NEW YORK, N. Y.

FIBER-CLEANING MACHINE.

SPECIFICATION forming part of Letters Patent No. 361,838, dated April 26, 1887.

Application filed July 15, 1886. Serial No. 208,118. (No model.)

*To all whom it may concern:*

Be it known that I, ARTHUR WILLIAM SAVAGE, of the city, county, and State of New York, have invented a new and Improved Fiber-Cleaning Machine, of which the following is a full, clear, and exact description.

My invention relates to the construction of a machine whereby fiber-containing material is drawn by an upper gripper from a delivery-chute to a carrier-belt which continually advances toward a macerating-roller, and after the material has been so drawn from the chute it rests upon the carrier-belt and is allowed to advance with said carrier-belt to be acted upon by the macerating-roller. It is then drawn back against the action of said roller, the cleaned ends are caught by a lower set of gripper-fingers, and the uncleaned ends are thrown over upon the endless carrier-belt to be advanced by said belt to the macerating-roller, and said ends having passed between the said roller and its bed, the material is again drawn back against the action of the roller and automatically dropped from the machine, a second lot of material being drawn from the chute as the final operation is performed upon the first lot of material.

The invention consists of certain novel constructions and combinations whereby the operation above described is rendered possible, which constructions and combinations will be hereinafter described, and specifically pointed out in the claims.

Reference is to be had to the accompanying drawings, forming a part of this specification, in which similar figures of reference indicate corresponding parts in all the views.

Figure 1:
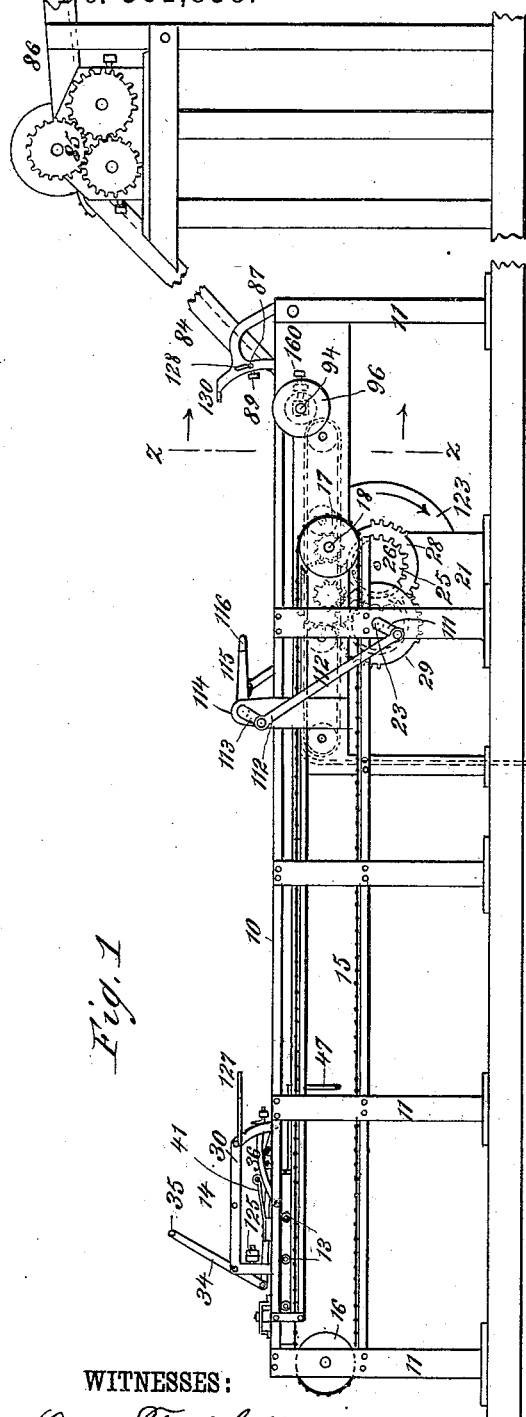
Figure 2:
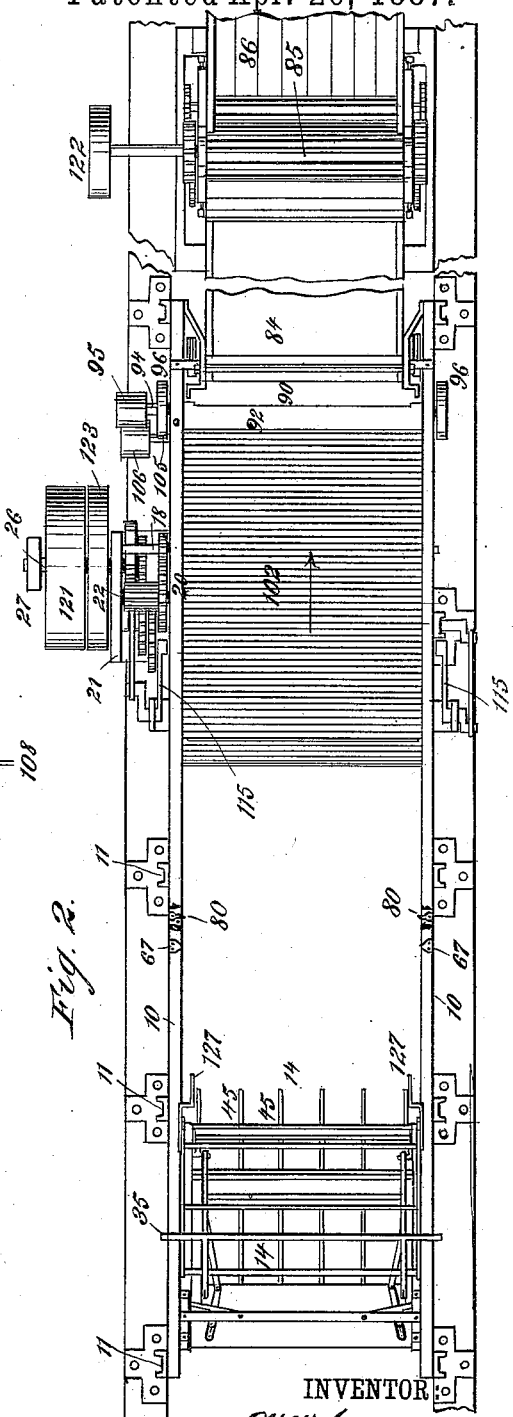
Figure 3:
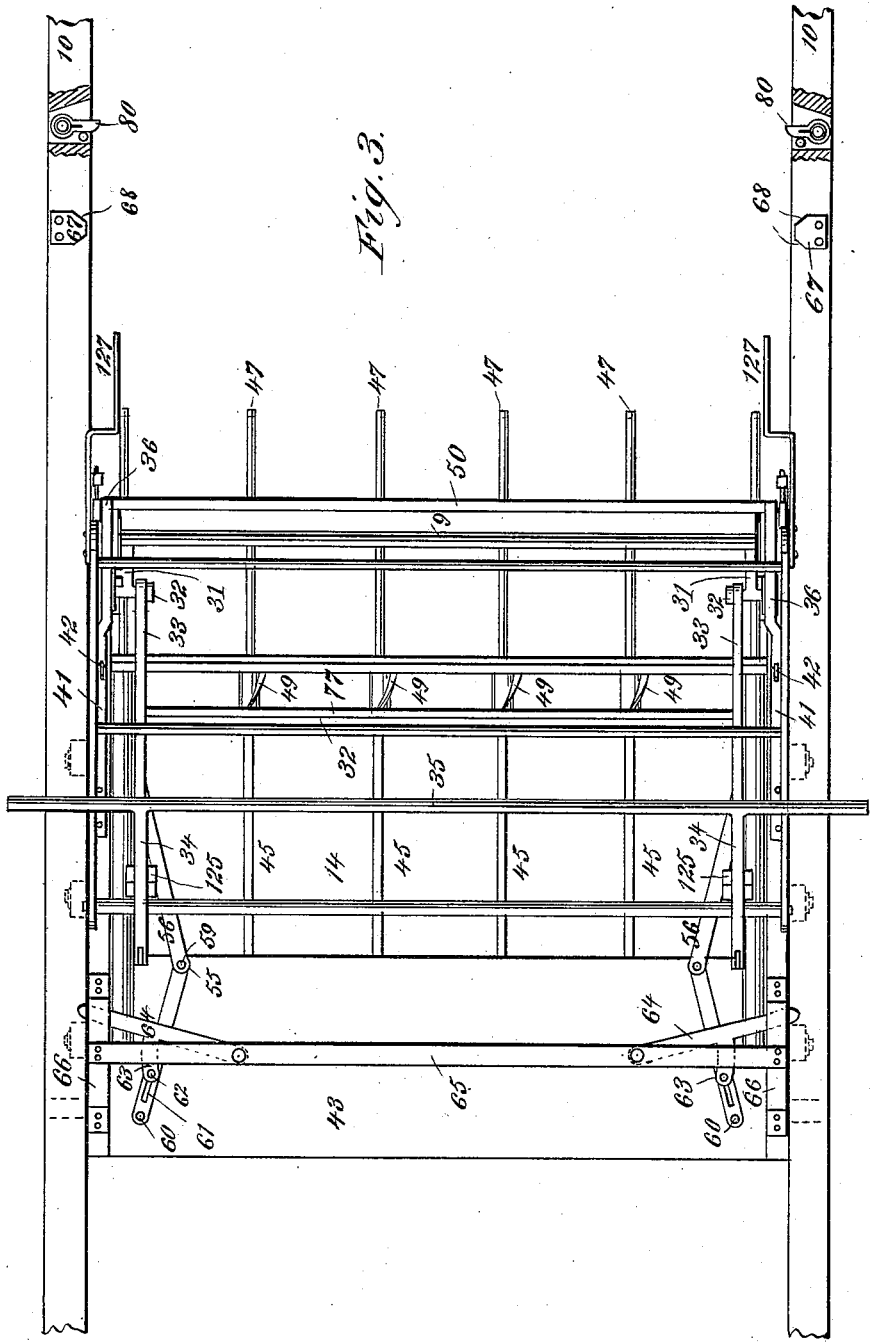
Figure 4:
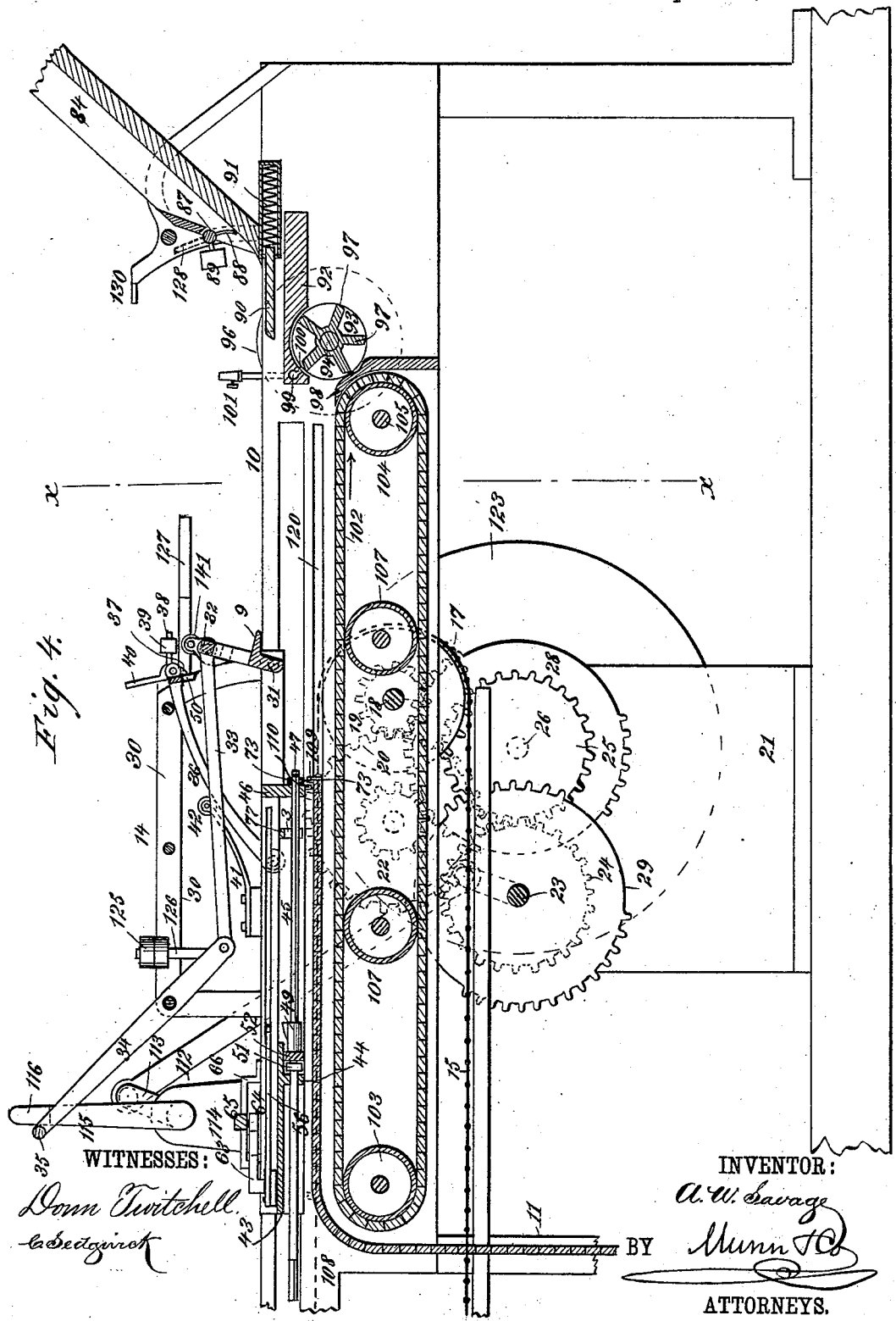
Figure 5:
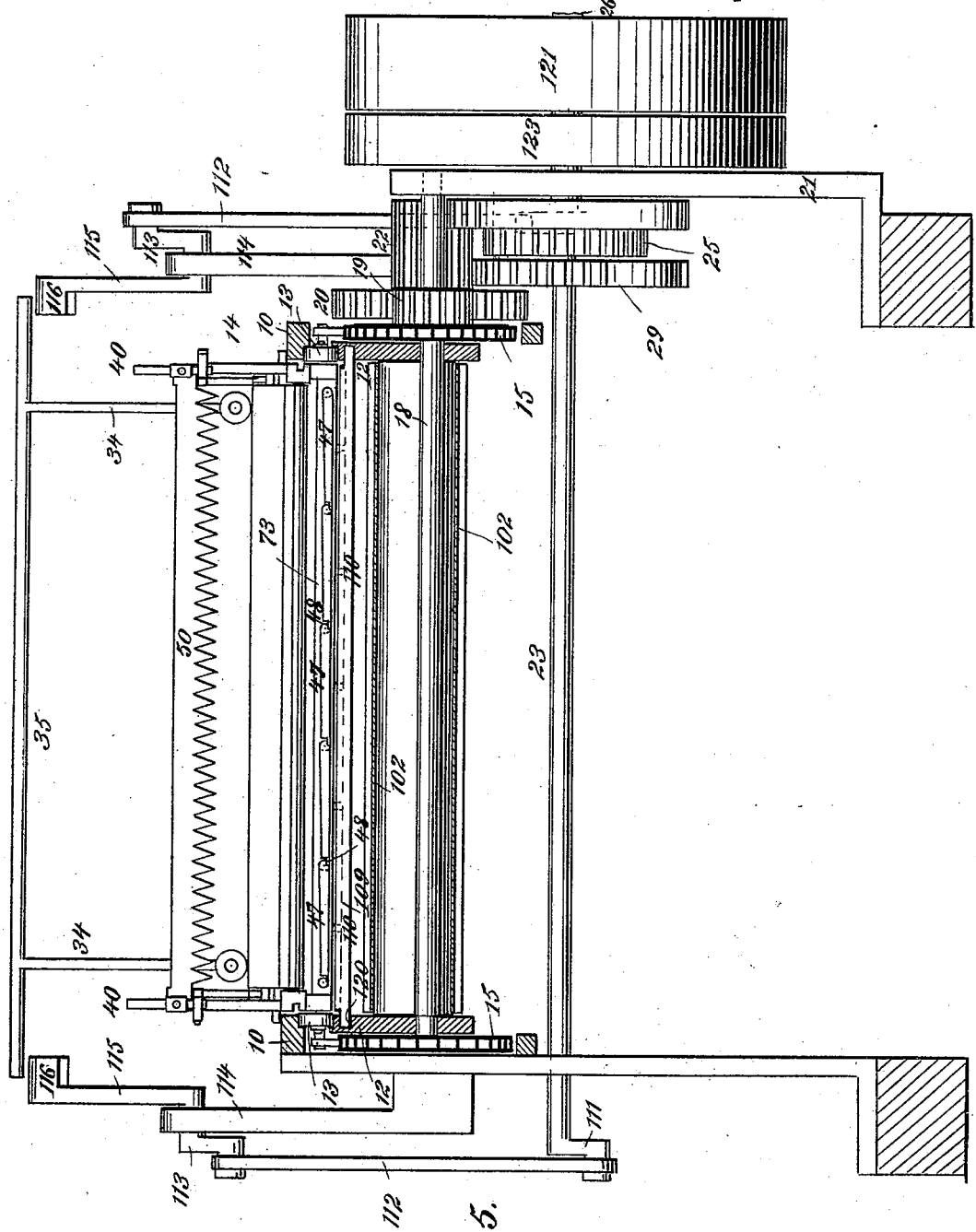
Figure 6:
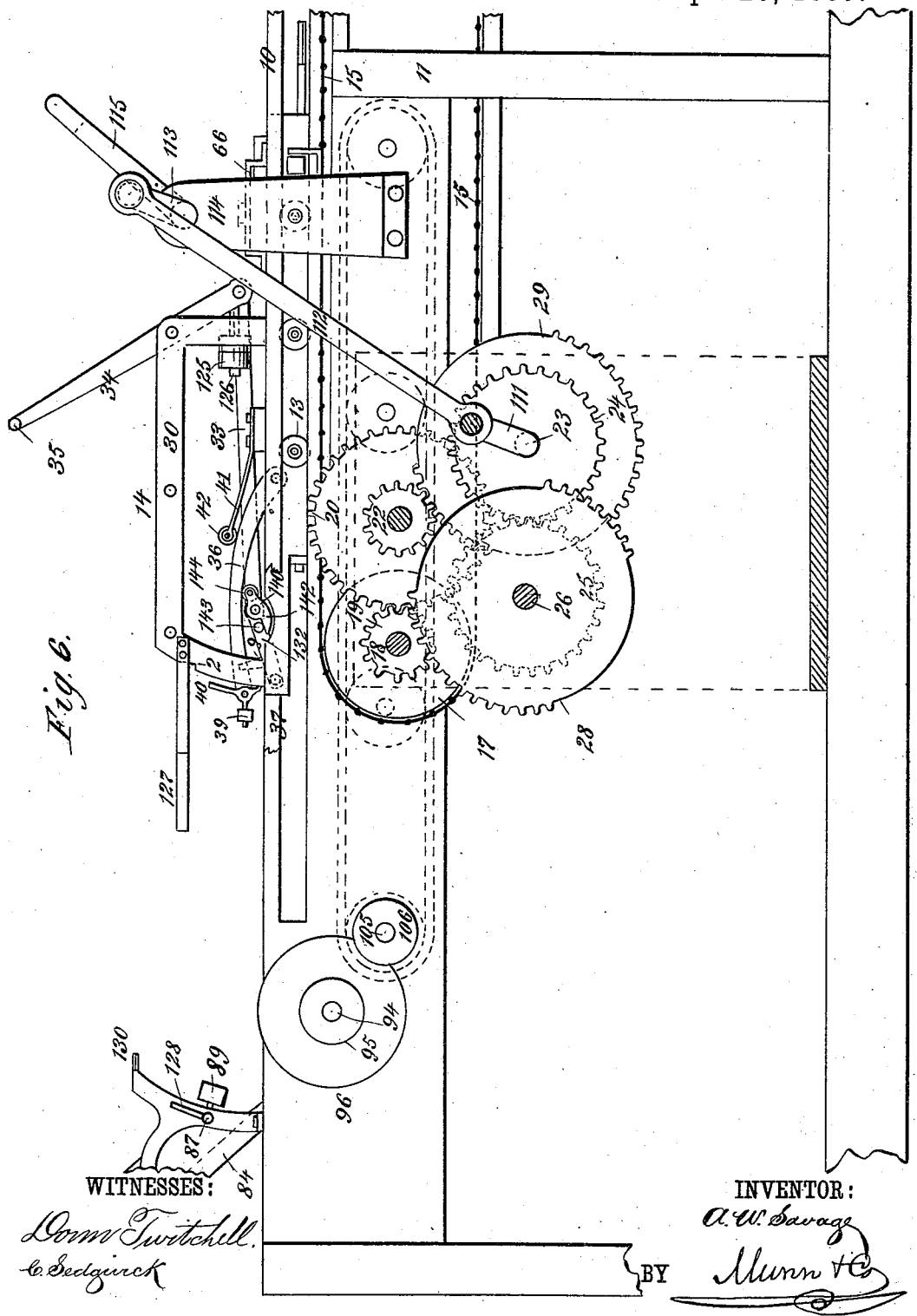
Figure 10:
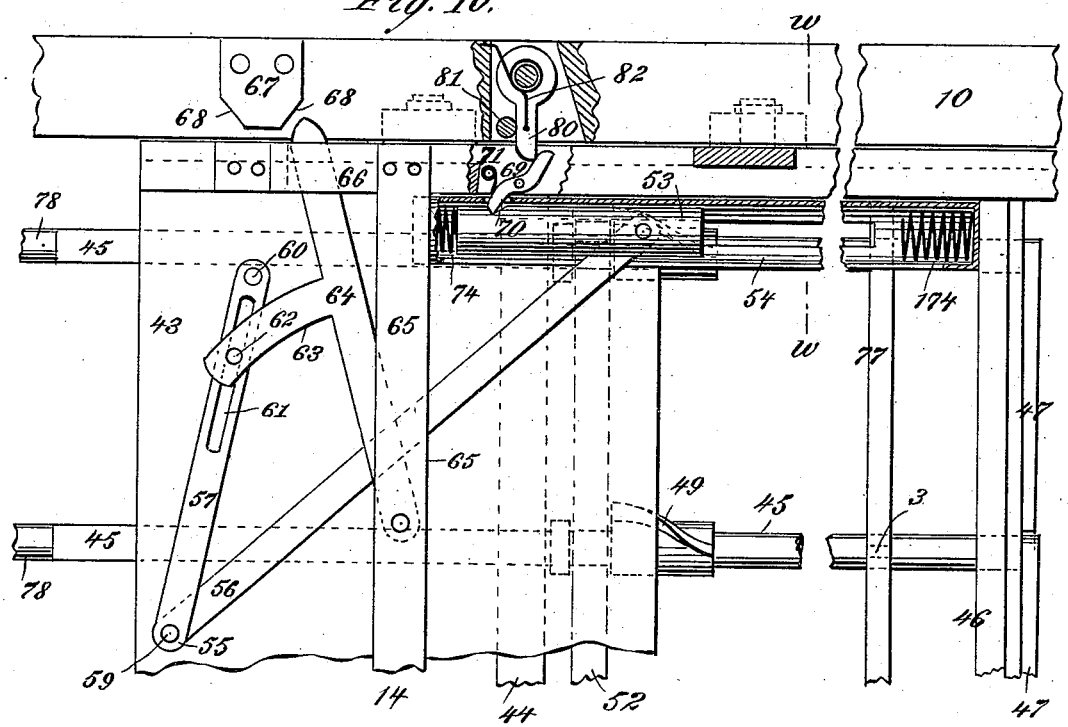
Figure 11:
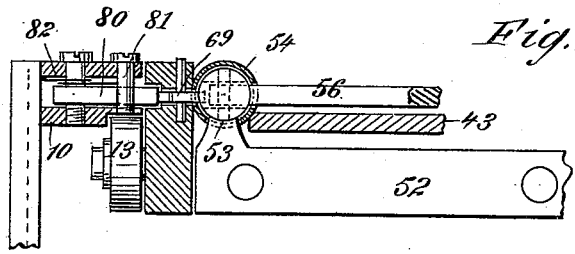

Figure 1 is a side view of my improved fiber-cleaning machine. Fig. 2 is a plan view of the same. Fig. 3 is an enlarged plan view of a portion of the frame and of the reciprocating gripper-carriage. Fig. 4 is a longitudinal sectional view of the carriage and of the forward portion of the machine, the parts being represented in the position they assume just after the uncleaned ends of the fiber have been thrown over upon the carrier-belt. Fig. 5 is an enlarged cross-sectional view taken on the line $x\ x$ of Fig. 4. Fig. 6 is an enlarged view of a portion of one side of the machine, the parts of the reciprocating gripper-carriage being represented in the position they assume just after they have received a supply of fiber. Fig. 7 is a longitudinal sectional view of the carriage and a portion of the frame, the parts being represented in the position they assume just prior to the gripping of those ends of the fiber that were first cleaned. Fig. 8 is a cross-sectional view taken on the line $y\ y$ of Fig. 7. Fig. 9 is a sectional view of a portion of the machine, taken on line $z\ z$ of Fig. 1. Fig. 10 is an enlarged plan view of the reciprocating carriage in partial section, wherein parts are broken away. Fig. 11 is a cross-sectional view taken on line $w\ w$ of Fig. 10.

In constructing such a machine as the one illustrated in the drawings above referred to I provide a main frame, which serves as a support for the various shafts, belts, and other movable portions of the machine; and this frame consists, essentially, of parallel longitudinal bars 10, that are supported by posts 11, there being as many of these posts as may be necessary, in order that a proper rigidity may be given to the bars 10. Just beneath the bars 10 are arranged other bars, 12, that are flanged, and these two sets of bars 10 and 12 together constitute the ways, within which the wheels or rollers 13 of a reciprocating gripper-carriage, 14, ride. The carriage 14 is driven by endless chains 15, said chains being mounted upon sprocket-wheels 16 and 17, the wheels 16 being simply guiding and supporting wheels, while the wheels 17 are driving-wheels. The wheels 17 are mounted upon a transverse shaft, 18, which carries a pinion, 19, that is engaged by a large gear, 20, carried by a shaft which is mounted in proper bearings supported by the main frame of the machine and an auxiliary frame or standard, 21, said gear 20 being made integral with or rigidly connected to a broad-faced pinion, 22. Below the plane in which the shaft of the gear 20 and the pinion 22 is arranged, I mount a transverse shaft, 23, which carries a gear, 24, said gear being engaged with a corresponding gear, 25, that is carried by the driving-shaft 26, said driving-shaft being mounted in proper bearings supported by the auxiliary frame or standard 21, and an outer standard, 27; or the bearings of this shaft 26 may be supported in any other suitable manner.

The shafts 26 and 23 each carry mutilated gear-wheels, as 28 and 29, the teeth of said gear-wheels being arranged so that they will engage alternately with the teeth of the broad-faced pinion 22, each of the gears 28 and 29 being provided with two sets of teeth, one set of teeth on each wheel being so arranged that by engaging with the pinion 22 the chain 15 will be moved a distance sufficient to carry the carriage 14 from one end to the other of the machine, while the other set of teeth formed upon each of the gears 28 and 29 is so proportioned that when they engage with the pinion 22 the chain will be moved so as to carry the carriage 14 from the forward end of the machine to about the middle of the full line of travel by one set of teeth and back again to the forward end of the machine by the other set, it being understood that one set of teeth advances the chain in one direction, while the other advances the chain in the opposite direction.

Upon the carriage proper, which consists of a main frame made up of side frames, 30, and cross-bars, as illustrated, there is pivotally mounted a gripper-bed, 31, formed with an upwardly-extending flange, 9, this bed being connected to the forward end of the carriage 14. At each end of the gripper-bed 31 there are arranged arms 32, that are connected by rods 33 with the lower ends of levers 34, said levers being pivotally connected to the upper part of the rear end of the carriage 14, and the upper ends of the levers 34 are united by a cross-rod, 35, the ends of which extend out beyond the sides of the carriage, as best shown in Fig. 3.

To each of the side frames, 30, of the carriage 14 there are pivotally connected lever-arms 36, which carry a toothed gripper-bar, 50, said bar being rigidly connected to the lever-arms named. These lever-arms 36 carry catches 37, that are pivotally connected to the arms and formed with outwardly-extending arms 38, upon which there are mounted weights 39 and with upwardly-extending arms 40, the purpose of which will be hereinafter explained.

Short arms 140, which carry rollers 141, are pivotally connected to the arms 32, the arms 140 being provided with extensions 142, which rest against limit-pins 143, that are fixed to the arms 32, the rollers 141 bearing against the under faces of the levers 36.

The forward ends of the frames 30 are circular and are concentric with the axes of the levers 36, which levers are normally held in the position in which they are shown in Fig. 7 by springs 41, that are secured in any proper manner to the carriage, and which are provided with rollers 42, that ride upon the upper faces of the levers 36. Although, as stated, the normal position of the levers 36, and consequently of the serrated or toothed gripper-bar 50, is as illustrated in Fig. 7, the levers may be raised to such a position that the catches 37 will be brought into engagement with notches 2, formed in the forward curved faces of the side frames, 30, this movement being brought about by throwing the levers 34 in the direction of the arrow, (shown in connection therewith in Fig. 7,) the catch-teeth 37 being forced into the notches 2 by the action of the weights 39 as the levers are moved above said notches.

At the rear of the carriage 14 there is secured a broad cross-plate, 43, beneath which there is mounted a cross-bar, 44, formed with a series of square apertures which act as guides for a series of longitudinal rods, 45, the other outer ends of said rods being guided in apertures formed in the forward cross-piece, 46, of the carriage 14. Each of the rods 45 carries a gripper-finger, 47, which fingers are rigidly secured to the rods and project at right angles therefrom, the ends of the gripper-fingers being formed with projections or lugs 48, which enter correspondingly-formed recesses, 8, in the butt-ends of the adjacent fingers.

The rods 45 carry quarter screw-cams 49 and collars 51, and between these collars and the rear ends of the sleeves upon which the cams 49 are formed there is arranged a cross-bar, 52, the ends of which are connected with plungers 53, that ride within longitudinally-slotted cylinders 54, which cylinders are carried by the frame of the carriage 14, the general arrangement being best shown in Figs. 3 and 10.

To each of the plungers 53 there is pivotally connected one end of a link-lever, 55, said lever consisting of links 56 and 57, that are connected by a pivot-bolt, 59, the other end of the link, 67, being connected to the plate 43 by a pivot-bolt, 60. The link 57 is formed with a longitudinal slot, 61, in which there rides a stud, 62, that is carried by a rearwardly-extending arm, 63, of a lever, 64, the inner end of said lever 64 being pivotally connected to a cross-bar, 65, that is rigidly mounted so as to extend across the upper face of the plate 43, the ends of the bar 65 being supported by brackets 66. The free ends of the levers 64 extend outward beyond the carriage, overlapping the upper faces of the bars 10, these ends being rounded off, as is clearly shown in Fig. 10.

Stops 67, formed with inclined faces 68, are rigidly connected to the upper faces of the bars 10, said stops being arranged in the path of the projecting ends of the levers 64. As the carriage 14 is moved forward, and as the ends of the levers 64 strike against the rear-inclined faces of the stops 67, the levers 64 are carried backward and the plungers 53, and with them the cross-bar 52 and the longitudinal bars 45, are carried to the rear; and as the plungers 53 are moved forward to their full extent they are caught and held by the pawls 69, which are pivoted within recesses formed in the frame of the carriage, the point of each pawl passing through an opening formed in the outer face of the cylinder 54, and engaging with a notch, 70, formed in the plunger 53, the inward throw of the pawl being brought about by the action of a spring, 71, arranged as best shown in Fig. 10.

When the longitudinal rods 45 are in the position just described, their fingers 47 will be in a horizontal line and will be pressed against a rubber cushion, 73, that is carried by the forward cross-bar, 46, of the carriage 14; but as the carriage is moved to the rear, after having been advanced to the forward end of the machine, the outwardly-projecting end of the pawl 69 will be released from engagement with the notch 70 of the plunger 53, and a spring, 74, arranged between the rear end of the plunger and the rear end of the cylinder 54, will act to throw the plunger 53 forward, and as the plunger is so moved forward the end of the lever 64 will be thrown outward, so as to strike against the forward inclined face of the stop 67. As the motion of the carriage continues the plungers and the parts connected thereto will be held in place until the cams 49 have passed beyond the cross-bar 77, the cams entering closely-fitting recesses 3, formed in the said cross-bar, so that a quarter-turn will be given to the rods 45, the fingers 47 being thereby carried to a vertical position, this turning of the rods 45 being made possible by reason of the fact that the extreme rear ends the rods are rounded, as shown at 78.

The pawls 69 are tripped by fingers 80 that are pivotally mounted within recesses formed in the side rails of the machine, said fingers being held against limit-pins 81 by exceedingly light springs 82, the arrangement being such that as the carriage moves forward the pawls 69 will move the fingers 80 against the tension of their springs; but as the carriage moves back the fingers will strike against the limit-pins and the pawls 69 will be freed from engagement with the plungers 53, so that when the levers 64 reach the stops 67 the plungers 53 will be free to move with the cylinders 54.

As the carriage 14 travels to the rear of the machine and the plunger 53 is forced forward by the action of the stops 67 upon the lever 64, it will be seen that the rounded end of the lever will necessarily be moved within the line of the stop; and in order that the lever may be moved outward to be acted upon by the stop as the carriage again moves forward, I provide a spring, 174, against which the plunger is thrown, and which will act to return the lever 64 to the required position.

Just in front of the main frame of the machine there is a chute, 84, through which the fiber-containing material to be cleaned is free to fall after the material has been previously broken by a set of breaking-rollers, 85, that is arranged at the point of junction of the chute 84 and the feed-trough 86, this construction being best shown in Fig. 1. These breaking-rollers 85 are preferably formed with corrugated peripheral faces, and are substantially the same as the breaking-rollers ordinarily employed in sugar-cane presses. At the bottom of the chute 84 there is arranged a transverse shaft, 87, which carries downwardly-extending tines or fingers 88, that are normally held in about the position in which they are shown in Fig. 4 by a weight, 89.

At the bottom of the chute 84 there is arranged a table, 90, mounted so as to slide in ways formed in the frame of the machine, and this table is normally held extended by springs 91, said springs being arranged in proper casings beneath the chute. This table 90 projects out over a guard or shield, 92, which is arranged above a macerating-roller, 93, said roller 93 being carried by a shaft, 94, that is driven by a pulley, 95, and is preferably provided with balance-wheels 96. The ridges or beaters 97 of the roller 93 are arranged so as to extend spirally about the axis of the roller, this arrangement being adopted in order that there may be no sudden pressure or jar, as would be the case if the ridges were parallel with the axis of the roller.

In front of the roller 93 there is a bed, 98, to or from which the roller 93 may be adjusted, the shaft 94 being mounted in bearings that are adjusted by a set-screw, 160. In the shield 92 there is a transverse opening, 99, from the under side of which there leads a slit, 100, the opening 99 being fed with water that is introduced through a coupling-piece, 101, that is arranged as best shown in Fig. 4.

Just in advance of the macerating-roller 93 I arrange an endless carrier belt or apron, 102, that is mounted upon rollers 103 and 104, the roller 104 being carried by a shaft, 105, to which there is fixed a driving-pulley, 106. In order to prevent the sagging of the apron 102, I arrange supporting-rollers 107, located as best shown in Fig. 4, all of the rollers used in connection with the apron being mounted in proper bearings, that are carried by the main frame of the machine.

Just back of the apron 102 I arrange a second apron or shield, 108, consisting, preferably, of properly-united strips of wood, the ends of which ride in grooves 120, formed in the side rails of the machine, the forward strip being provided with an upwardly-extending ridge, 109, that is in the path of downwardly-extending lugs 110, that are fixed to or made integral with the forward cross-bar 46 of the carriage 14.

Upon each end of the shaft 23 there is a crank-arm, 111, each of said crank-arms being connected by a link, as 112, with a short crank-arm, 113, that is mounted in bearings formed in standards 114, that are arranged just above the rear end of the belt or apron 102. Each of the cranks 112 carries an arm, 115, said arm 115 being formed with a plate, 116, upon its extending end.

From the construction described it will be seen that as the shaft 23 is revolved the arms 115 will be revolved, and the motion of these arms is so timed that as the carriage 14 advances to receive a fresh supply of material they will strike against the extending ends of the rod 35 and throw the levers 34, with which the rod is connected, to the position in which the said levers are shown in Fig. 4; and this movement of the levers will tilt the gripper-bed and at the same time raise the arms 36, which carry the gripper-bar 50, the purpose of which movement will be presently explained. The shaft 26, which is the main driving-shaft of the machine, is driven by a belt which runs in engagement with a pulley, 121, and the breaking-rollers 85 are driven by a belt which passes over a pulley, 122, carried by the shaft of the upper roller, said belt being in turn driven by a pulley, 123, carried by the shaft 26. A motion independent of the motion imparted to the shaft 26 is given to the shaft 105 of the endless apron or belt 102 by a properly-arranged belt which runs in connection with the pulley 106, and the macerating-roller is in turn driven by a belt which runs in engagement with the pulley 95; and in adjusting the rate of travel it will be understood that the belt or apron 102 is arranged so that it will travel at a much higher rate of speed than will be imparted to the carriage 14 through the medium of the driving-chains 15.

In describing the operation of the machine, we will assume that the carriage is in the position in which it is represented in Figs. 1 and 2—that is, at the rear of the machine. At this time the larger set of teeth upon the mutilated gear-wheel 28 will be in engagement with the teeth of the broad-faced pinion 22, and as the shaft 26 is revolved in the direction of the arrow shown in connection with the pulley 123 in Fig. 1, the carriage will be carried forward to a position to receive a supply of material from the chute 84; and in describing this first movement of the carriage we will suppose it to be the initial movement of the machine—that is, a movement prior to the delivery of any material from the chute 84.

The first change in the movable parts carried by the carriage 14 is that effected by the movement of the levers 64 when they strike against the stops 67, this movement being a withdrawing of the plungers 53 and a locking of said plungers in the position in which they are shown in Fig. 10. As the carriage continues to advance, the plates 116, that are carried by the arms 115, will strike against the ends of the rod 35 and raise the gripper-bed 50 to a position so that its catch-teeth 37 will enter the recesses 2 formed in the forward curved face of the frame of the carriage, the gripper-bed at this time being thrown forward to the position indicated in Fig. 4; but immediately after the plates 116 have passed from engagement with the ends of the rod 35, weights 125, carried by short arms 126, that project outward from the levers 34, will act to return the gripper-bed to the position in which it is shown in Fig. 6, the gripper-bar 50, however, being retained in its elevated position, the articulated roller-carrying arms 140, that are secured to the arms 32 of the gripper-bed, at this time turning upon their pivotal connection with the arms 32 and passing beneath the arms 36 without lifting them; but as the projections on said roller-carrying arms strike against the frame of the carriage the arms will be returned to their normal position. As the carriage advances the forward end of the frame will strike against the sliding table 90, and at the same time the forwardly-extending rods 127 will strike against upwardly-extending arms 128, that are carried by the shaft 87, so that just before the time when the carriage 14 reaches its full line of travel the tines 88 will be thrown up, and the material from which the fiber is to be extracted, that is within the chute 84, will be free to fall downward over the table 90 and onto the gripper-bed 31, the material striking against the upwardly-extending flange 9 of the said gripper-bed. At the instant the carriage 14 reaches its full line of travel the arms 40 of the catches 37 will strike against outwardly-extending stops 130 and the teeth 37 will be thrown out of engagement with the recesses 2, and immediately upon the disengagement of the teeth 37 the springs 41 will force the arms 36 downward, so that the gripper-bar 50 will be brought into engagement with the material resting upon the gripper-bed 31.

Immediately after the action just described has taken place the shorter set of teeth formed upon the mutilated gear 29 will come into engagement with the broad-faced pinion 22 and the driving-chain 15 will be moved in a reverse direction, so that the carriage 14 will be carried toward the rear of the machine, and as the carriage so moves toward the rear of the machine the material within the grip of the bar 50 will be drawn downward out of the chute 84, to be spread upon the upper face of the carrier belt or apron 102, which continually moves forward in the direction of the arrow shown in connection therewith in Fig. 4, and any loose material will be retained by the tines 88. After this rearward movement of the carriage has been brought about the shorter set of teeth upon the gear 28 comes into engagement with the teeth of the pinion 22, and the carriage 14 is again moved forward, the fiber-containing material at this time passing over the bed 98 and into the bite of the macerating-roller 93, which is subjected to the action of water that issues from the slit 100, and this forward travel being accomplished, the larger set of teeth on the gear 29 comes into engagement with the teeth of the pinion 22, and the carriage is carried to the extreme rear end of the machine, the material being drawn out against the action of the roller 93. As the material is drawn off from the belt 102, the clean ends fall downward in front of the forward rubber-faced cross-bar 46 of the carriage 14, so that as the carriage starts forward upon its second full forward line of travel the cleaned ends of the fiber will be between the fingers 47 (which at this time are in the position shown in Fig. 3) and the said rubber-faced forward cross-bar 46. The forward movement of the carriage will, as before stated, cause the gripper-fingers 47 to move to a horizontal position, so that the projecting ends of the fingers will interlock with the heels of the adjacent fingers, and the fiber will be locked between the fingers and the rubber-faced bar 46, this locking being brought about in the manner hereinbefore described in connection with the movement of the fingers 47. As the carriage continues to advance, the movement hereinbefore described in connection with the gripper-bed 31 and the gripper-bar 50 will take place, and the uncleaned ends of the material will be thrown upon the carrier-belt 102, to be carried forward toward the macerating-roller 93, the upper gripping mechanism taking a fresh supply of material at this second forward full travel of the carriage, which second supply of material is drawn out over the belt 102 at the time when the carriage is moved backward to finally withdraw the first supply of fiber from between the macerating-roller and its bed, and this first supply of fiber is dropped from the machine—that is, from between the gripper-fingers 47 and the rubber-faced bar 46, at the time when the fingers 80 trip the pawls 69, to permit a proper action of the levers 64, when they come into engagement with the stops 67, the cleaned ends of the second supply of material falling downward to a position to be clamped by the fingers 47 just at the time when the first supply of cleaned fiber is delivered from the machine.

Having thus described my invention, what I claim as new, and desire to secure by Letters Patent, is—

1. In a fiber-cleaning machine, a reciprocating carriage provided with two sets of gripping attachments, substantially as shown and described.

2. In a fiber-cleaning machine, a reciprocating carriage provided with an upper and a lower set of gripping attachments, substantially as shown and described.

3. In a fiber-cleaning machine, a reciprocating carriage provided with a gripper-bar and a set of gripper-fingers, substantially as described.

4. In a fiber-cleaning machine, a reciprocating carriage provided with a tilting gripper-bed and a gripper-bar, substantially as described.

5. In a fiber-cleaning machine, the combination, with a reciprocating carriage, of a gripper-bed, a gripper-bar arranged in connection therewith, and a mechanism, substantially as described, whereby the gripper-bed is tilted and the gripper-bar raised, substantially as specified.

6. In a fiber-cleaning machine, the combination, with a reciprocating carriage, of a gripper-bed pivotally connected to the carriage-frame, levers 34, also pivotally connected to the carriage-frame, connecting-links 33, a gripper-bar, 50, carried by lever-arms 36, and a mechanism, substantially as described, whereby the levers 34 are thrown, as and for the purpose stated.

7. In a fiber-cleaning machine, the combination, with a carriage carrying two sets of gripping attachments, of endless driving-chains to which the carriage is connected, sprocket-wheels arranged to support the driving-chains, a broad-faced pinion, connections between said pinion and one set of sprocket-wheels, mutilated gears arranged to engage with the broad-faced pinion, and mechanisms for driving the mutilated gears, substantially as described.

8. In a fiber-cleaning machine, the combination, with a reciprocating carriage and its driving mechanism, of a gripper-bed, a gripper-bar, a mechanism, substantially as described, for raising the gripper-bar, a catch for holding the bar in an elevated position, a mechanism, substantially as described, for feeding the fiber to the gripper-bed, and mechanism for tripping the upholding catch of the gripper-bar, substantially as described, for the purpose specified.

9. In a fiber-cleaning machine, the combination, with the delivery-chute and the reciprocating gripper-carriage, of a sliding table, substantially as described.

10. In a fiber-cleaning machine, the combination, with a delivery-chute and a reciprocating gripper-carriage, of the table 90 and springs 91, substantially as described.

11. In a fiber-cleaning machine, the combination, with a macerating-roller and its bed, of an endless carrier-belt and a mechanism whereby the upper face of the belt is advanced toward the macerating-roller, substantially as described.

12. In a fiber-cleaning machine, the combination, with the delivery-chute, of tines carried by a shaft extending across said chute and a mechanism, substantially as described, whereby the tine-carrying shaft is rocked to deliver the partial contents of the chute, as and for the purpose stated.

13. In a fiber-cleaning machine, the combination, with a reciprocating gripper-carriage and a gripper-operating mechanism, of an endless carrier-belt, and an apron arranged to be drawn up over the endless carrier-belt, substantially as described.

14. A fiber-cleaning machine provided with a movable apron or shield, 108, substantially as described.

15. In a fiber-cleaning machine, the combination, with a reciprocating carriage provided with lugs 110, of a shield or apron, 108, provided with a ridge, 109, substantially as described.

16. In a fiber-cleaning machine, a gripper-carriage, in combination with a mechanism whereby the carriage is advanced the full length of the machine, moved back part way to the rear, again advanced, and finally moved back to the rear of the machine, substantially as described, and for the purpose stated.

17. In a fiber-cleaning machine, the combination, with a macerating-roller and its bed, of a gripper-carriage, gripper-operating mechanism, substantially as described, a feeding belt or apron, and a mechanism whereby the gripper-carriage is advanced the full length of the way, moved back over the feeding-apron, again advanced, and finally moved back to the rear of the machine, substantially as described, and for the purpose stated.

18. In a fiber-cleaning machine, the combination, with a macerating-roller and its bed, of an endless feeding-apron, a gripper-carriage, a carriage-reciprocating mechanism, and a mechanism whereby the feeding-apron is advanced at a speed greater than that imparted to the carriage, substantially as described.

19. In a fiber-cleaning machine, gripper-fingers 47, substantially as described.

20. In a fiber-cleaning machine, gripper-fingers 47, formed with projections 48 and recesses 8, substantially as described.

21. In a fiber-cleaning machine, the combination, with the carriage and its reciprocating mechanism, of gripper-fingers and a mechanism whereby said fingers are moved longitudinally and turned to interlock, substantially as described.

22. In a fiber-cleaning machine, the combination, with a reciprocating carriage, of gripper-fingers 47, bars 45, to which said fingers are secured, cams 49, connected to the bars 45, a cross-bar, 77, formed with recesses through which the cams pass, a cross-rod, 52, plungers 53, and mechanisms, substantially as described, whereby the fingers are operated, substantially as described.

23. In a fiber-cleaning machine, the combination, with a set of breaking-rollers, of an inclined chute, retaining-tines arranged near the bottom of said chute, a spring-pressed sliding table, a macerating-roller, an endless carrier-belt, a gripper-carriage, and mechanisms, substantially as described, whereby the carriage is reciprocated and its grippers operated, as and for the purpose stated.

ARTHUR WILLIAM SAVAGE.

Witnesses:
EDWARD KENT, Jr.,
EDGAR TATE.